(12) United States Patent
Albers et al.

(10) Patent No.: US 9,921,694 B2
(45) Date of Patent: Mar. 20, 2018

(54) WEARABLE COMPUTING DEVICE

(71) Applicant: Intel Corporation, Santa Clara, CA (US)

(72) Inventors: Sven Albers, Regensburg (DE); Klaus Reingruber, Langquaid (DE); Teodora Ossiander, Sinzing (DE); Andreas Wolter, Regensburg (DE); Sonja Koller, Regensburg (DE); Georg Seidemann, Landshut (DE); Jan Proschwitz, Riesa (DE); Hans-Joachim Barth, Munich (DE); Bastiaan Elshof, Regensburg (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/778,142

(22) PCT Filed: Dec. 16, 2014

(86) PCT No.: PCT/US2014/070632
§ 371 (c)(1),
(2) Date: Sep. 18, 2015

(87) PCT Pub. No.: WO2016/099462
PCT Pub. Date: Jun. 23, 2016

(65) Prior Publication Data
US 2016/0224148 A1    Aug. 4, 2016

(51) Int. Cl.
*G09G 5/00*    (2006.01)
*G06F 3/044*    (2006.01)
(Continued)

(52) U.S. Cl.
CPC ............... *G06F 3/044* (2013.01); *G01L 1/24* (2013.01); *G06F 1/163* (2013.01); *G06F 3/038* (2013.01);
(Continued)

(58) Field of Classification Search
CPC  G06F 3/044; G06F 2203/04102; H04B 1/385
(Continued)

(56) References Cited

U.S. PATENT DOCUMENTS 9,223,494 B1 * 12/2015 DeSalvo ............... G06F 3/0488
2004/0239616 A1    12/2004 Collins
(Continued)

FOREIGN PATENT DOCUMENTS

EP    2194446 A2    6/2010
JP    0350941 A    3/1991
(Continued)

OTHER PUBLICATIONS

"International Application Serial No. PCT/US2014/070632, International Search Report dated Aug. 25, 2015", 3 pgs.
(Continued)

*Primary Examiner* — Jennifer Nguyen
(74) *Attorney, Agent, or Firm* — Schwegman Lundberg & Woessner, P.A.

(57) ABSTRACT

Some forms relate to wearable computing devices that include a "touch pad" like interface. In some forms, the example wearable computing devices may be integrated with (or attached to) textiles (i.e. clothing). In other forms, the example wearable computing devices may be attached directly to the skin of someone (i.e., similar to a bandage) that utilizes any of the example wearable computing devices. The example wearable computing devices include a flexible touch pad that may allow a user of the wearable computing device to more easily operate the wearable
(Continued)

computing device. The example wearable computing devices described herein may include a variety of electronics. Some examples include a power supply and/or a communication device among other types of electronics.

4 Claims, 12 Drawing Sheets

(51) Int. Cl.
*H04B 1/3827* (2015.01)
*G01L 1/24* (2006.01)
*G06F 1/16* (2006.01)
*G06F 3/038* (2013.01)
*G06F 3/042* (2006.01)
*G06F 3/045* (2006.01)
*G06F 3/0354* (2013.01)

(52) U.S. Cl.
CPC .......... *G06F 3/03547* (2013.01); *G06F 3/042* (2013.01); *G06F 3/045* (2013.01); *H04B 1/385* (2013.01); *G06F 2203/04102* (2013.01); *G06F 2203/04109* (2013.01)

(58) Field of Classification Search
USPC ........................................ 345/7, 8, 173–178
See application file for complete search history.

(56) References Cited

U.S. PATENT DOCUMENTS

| | | | |
|---|---|---|---|
| 2008/0180399 A1* | 7/2008 | Cheng | G06F 3/041 345/173 |
| 2010/0075511 A1 | 3/2010 | Kim et al. | |
| 2010/0141576 A1 | 6/2010 | Jeong et al. | |
| 2012/0271580 A1 | 10/2012 | Bartling et al. | |
| 2013/0104227 A1* | 4/2013 | Dow | G06F 21/31 726/19 |
| 2013/0127736 A1 | 5/2013 | Judson et al. | |
| 2014/0049487 A1* | 2/2014 | Konertz | G06F 3/041 345/173 |
| 2014/0104208 A1* | 4/2014 | Lee | G06F 3/0416 345/173 |
| 2014/0134575 A1 | 5/2014 | Kim | |
| 2014/0152621 A1 | 6/2014 | Okayama et al. | |
| 2015/0154936 A1* | 6/2015 | Lee | G09G 5/006 345/173 |

FOREIGN PATENT DOCUMENTS

| | | |
|---|---|---|
| JP | 2010134925 A | 6/2010 |
| JP | 2013152581 A | 8/2013 |
| JP | 2014052997 A | 3/2014 |
| JP | 2017503301 A | 1/2017 |
| KR | 20100033592 A | 3/2010 |
| KR | 20100064302 A | 6/2010 |
| KR | 20140062893 A | 5/2014 |
| RU | 2008133871 A | 2/2010 |
| TW | 201142685 A1 | 12/2011 |
| TW | 201636782 A | 10/2016 |
| WO | WO-2010097692 A1 | 9/2010 |
| WO | WO-2011137201 A2 | 11/2011 |

OTHER PUBLICATIONS

"International Application Serial No. PCT/US2014/070632, Written Opinion dated Aug. 25, 2015", 9 pgs.
Wimmer, Raphael, et al., "Modular and Deformable Touch-Sensitive Surface Based on Time Domain Reflectometry", In: UIST'11 Proceedings of the 24th annual ACM symposium on User Interface Software and Technology, (Oct. 16, 2011), 517-526.
"Japanese Application Serial No. 2016-565091, Office Action dated Feb. 28, 2017", (English Translation), 5 pgs.
"Korean Application Serial No. 2015-7032521, Office Action dated Dec. 5, 2016", W/ English Translation, 18 pgs.
"Korean Application Serial No. 2015-7032521, Response filed Feb. 2, 2017 to Office Action dated Dec. 5, 2016", w/ Claims in English, 21 pgs.
"Russian Application Serial No. 2015149217, Office Action dated Feb. 16, 2017", W/ English Translation, 14 pgs.
"Taiwanese Application Serial No. 104136027, Office Action dated Nov. 14, 2016", w/ English Claims, 15 pgs.
Raphael, Wimmer, "Modular and Deformatable Touch-Sensitive Surfaces Basedon Time Domain Reflectometry", UIST'11 Proceedings of the With restriction of 24th annual ACM symposium on User interface software and technology, (Oct. 16, 2011), 517-526.
"European Application Serial No. 14891132.4, Partial European Search Report dated Jun. 30, 2017", 8 pgs.
"Korean Application Serial No. 2015-7032521, Request for ReExamination filed Jul. 14, 2017 in response to Final Office Action dated Jun. 13, 2017"; w/ claims in English, 20 pgs.
"International Application Serial No. PCT/U52014/070632, International Preliminary Report on Patentability dated Jun. 29, 2017", 11 pgs.
"Japanese Application Serial No. 2016-565091, Response filed Apr. 17, 2017 to Office Action dated Feb. 28, 2017", w/ claims in English, 11 pgs.
"Korean Application Serial No. 2015-7032521, Final Office Action dated Jun. 13, 2017", W/ English Translation, 8 pgs.
"Russian Application Serial No. 2015149217, Response filed May 11, 2017 to Office Action dated Feb. 16, 2017", w/ claims in English, 14 pgs.
"Taiwanese Application Serial No. 104136027, Office Action dated May 25, 2017", w/English Claims, 12 pgs.
"Taiwanese Application Serial No. 104136027, Response filed May 12, 2017 to Office Action dated Nov. 14, 2016", w/ claims and amendments in English, 58 pgs.
"Japanese Application Serial No. 2016-565091, Office Action dated Sep. 5, 2017", W/ English Translation, 6 pgs.

* cited by examiner

WEARABLE COMPUTING DEVICE

This application is a U.S. National Stage Application under 35 U.S.C. 371 from International Application No. PCT/US2014/070632, filed Dec. 16, 2014, which is hereby incorporated by reference in its entirety.

TECHNICAL FIELD

Embodiments described herein generally relate to a computing device, and more particularly to a wearable computing device.

BACKGROUND

Wearable computing devices enable various approaches to managing different types of applications where computing power may be utilized to enhance the application. As examples, healthcare and fitness are examples of just a couple of applications that may utilize wearable computing devices.

Some existing wearable computing devices include glasses, bracelets and smart watches. Sometimes the size and/or the shape of a device make it challenging to provide user input give input into a wearable computing device. As examples, smart watches and bracelets may be operated by touch sensitive surfaces on the device or with knobs.

Other wearable computing devices (e.g., glasses) may be difficult to operate using knobs. The user input to glasses may be done by voice-operated commands, hand movement recognition in front of the glasses or eye motion control.

One class of wearable computing devices that is rising in importance relates to textiles which include integrated electronic devices. These wearable computing devices typically require a user interface. In some forms, a touch pad is integrated in the textile to receive user input and/or display data.

One of the challenges with conventional touch pad systems is that they typically require a large number of conductive lines that each needs to be monitored by its own detector. In addition, scaling such touch pads to a larger size means increasing the number of conductive lines and corresponding detectors.

One common type of touch pad relates to capacitive touch pads. Capacitive touch pads are sensitive to a change of dielectric constant in the vicinity of the touch pad. Capacitive touch pads may be incorporated into wearable computing devices that are integrated in textiles meant to be worn on the body.

One of the drawbacks with incorporating capacitive touch pads into textiles meant to be worn on the body is that there may often be strong noise by capacitive interaction with the body of the person wearing the wearable computing device. This strong noise due to capacitive interaction with the body may negatively affect performance of wearable computing device.

DESCRIPTION OF EMBODIMENTS

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Orientation terminology, such as "horizontal," as used in this application is defined with respect to a plane parallel to the conventional plane or surface of a wafer or substrate, regardless of the orientation of the wafer or substrate. The term "vertical" refers to a direction perpendicular to the horizontal as defined above. Prepositions, such as "on," "side" (as in "sidewall"), "higher," "lower," "over," and "under" are defined with respect to the conventional plane or surface being on the top surface of the wafer or substrate, regardless of the orientation of the wafer or substrate.

Figure 1:
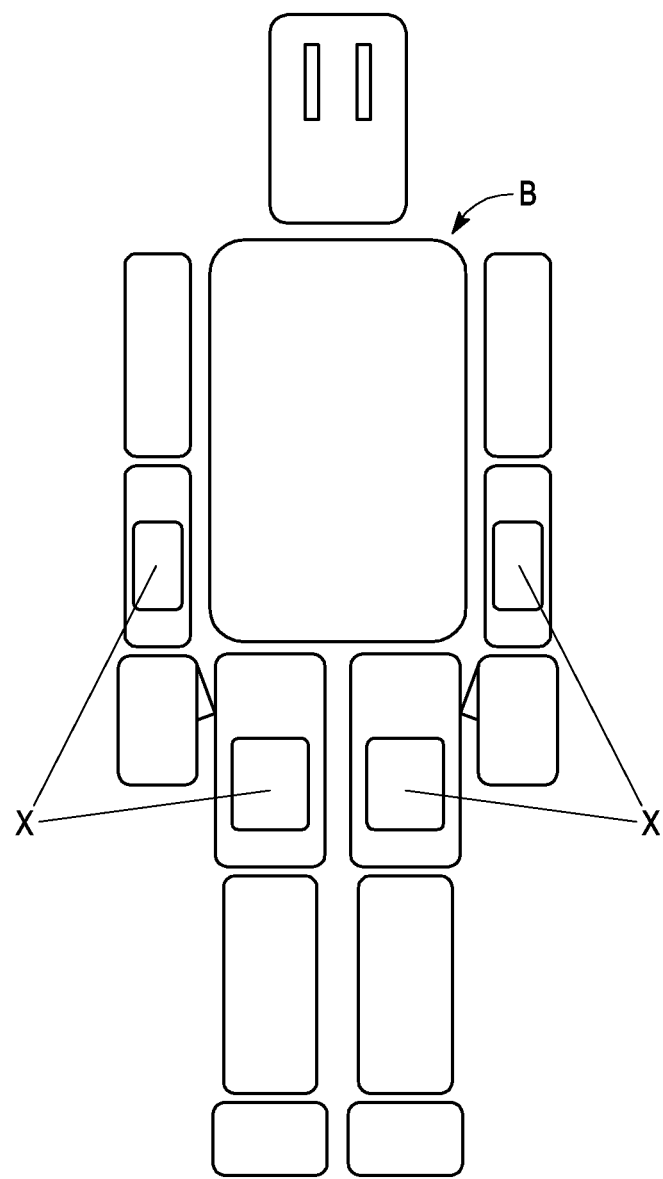
FIG. 1 is a schematic view illustrating example places where the wearable computing devices may be placed on a human body.

FIG. 1 is a schematic view illustrating example places X where wearable computing devices may be placed on a human body B. Several example wearable computing devices that include a "touch pad" like interface are described herein. In some forms, the example wearable computing devices may be integrated with (or attached to) textiles (i.e. clothing). In other forms, the example wearable computing devices may be attached directly to the skin of someone (i.e., similar to a bandage) that utilizes any of the example wearable computing devices.

The example wearable computing devices described herein include a flexible touch pad that may allow a user of the wearable computing device to more easily operate the wearable computing device. As an example, the flexible touch pad may include a cursor that may be moved or items so that items may be "clicked" in a discrete way (e.g., in a similar manner as is done with laptops and smart phones).

The example wearable computing devices described herein may include a variety of electronics. Some examples include a power supply and/or a communication device among other types of electronics.

In addition, a user may be able to more easily operate the wearable computing device that includes the flexible touch pad without finger fidgeting or speaking commands thereby maintaining user privacy. Eliminating finger fidgeting and/or speaking commands may be especially important for online banking or password typing applications.

One of the drawbacks with existing systems is that there may be inaccurate user input caused by the system misinterpreting spoken commands due to background noise. Another of the drawbacks with existing systems is that there may be unwanted user input that is caused by motion near the system. As an example, motion near the system may cause unwanted and/or misinterpreted input gesture analysis by such systems.

Figure 2:
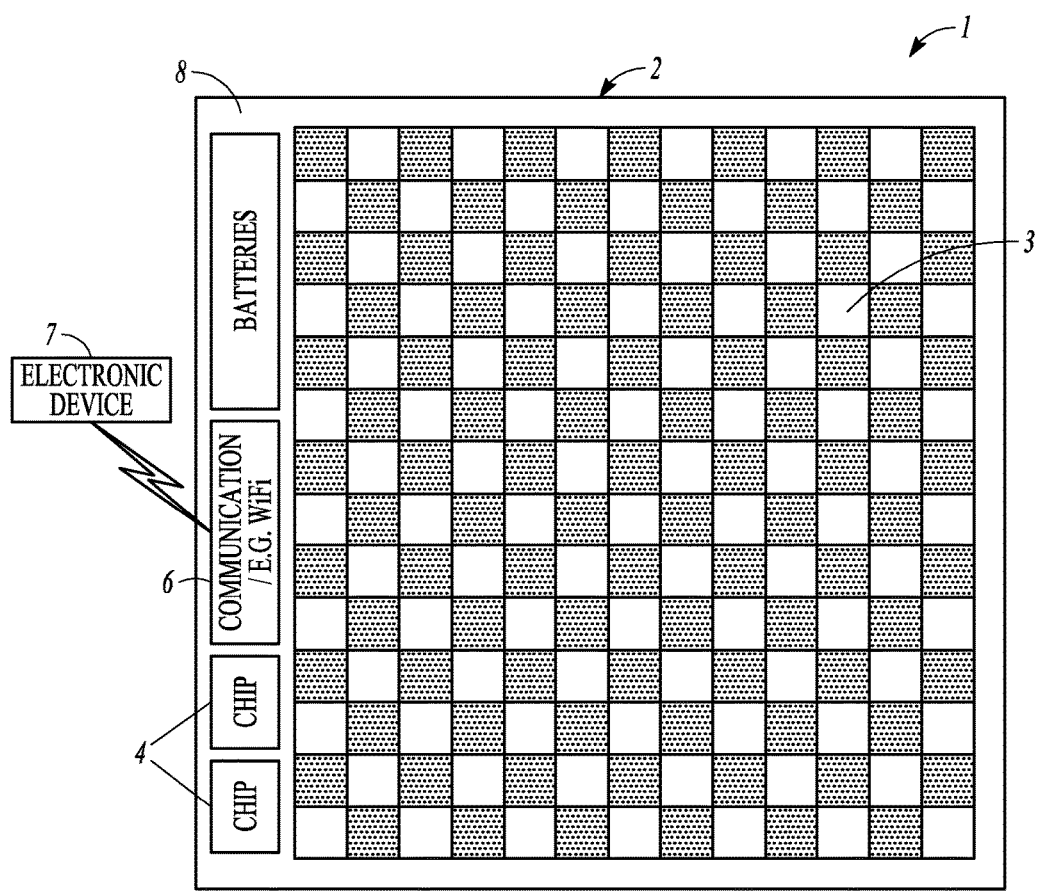
FIG. 2 is a top view of an example wearable computing device that includes a touch pad having a boundary area.

FIG. 2 is a top view of an example wearable computing device 1 that includes a flexible support 2 configured to be worn by a user of the example wearable computing device 1. The example wearable computing device 1 further includes a flexible touch pad 3 mounted to the flexible support 2.

As used herein "flexible" refers to the ability of the flexible touch pad 3 and the flexible support 2 to bend. The amount of bending will be determined in part on the application where any of the example wearable computing devices 1, 10, 20, 30, 40 described herein are to be used. As an example, the degree of bending may be different when the example wearable computing devices described herein are integrated with (or detachably connected to) textiles (i.e. clothing) as opposed when the example wearable computing devices described herein are attached directly to the skin of someone that utilizes any of the example wearable computing devices 1, 10, 20, 30, 40.

The example wearable computing device 1 further includes an integrated circuit(s) 4 mounted to the flexible support 2. The integrated circuit 4 interprets contact with the flexible touch pad 3.

The type of integrated circuit(s) 4 that are included in the example wearable computing device 1 will depend in part on the operations that the example wearable computing device 1 is to perform. It should be noted that the integrated circuit 4 may any type of integrated circuit that is known now, or discovered in the future.

The example wearable computing device 1 further includes a transceiver 6 mounted to the flexible support 2. The transceiver 6 sends and receives wireless signals to and from a separate electronic device 7 (e.g., via Bluetooth, Zigbee, etc.).

The separate electronic device 7 may also be worn by the user (e.g., as glasses or a power supply) or operate as an entity separate from the user's body. In some forms, the separate electronic device 7 may be side-by-side to the flexible touch pad 3, below the flexible touch pad 3 or anywhere else on or off the body depending on the form of the example wearable computing device 1.

The inclusion of a separate electronic device 7 may allow the wearable computing device 1 that includes the flexible support 2 and the flexible touch pad 3 to be more easily (i) configured into textiles that are incorporated into clothing; (ii) configured to be detachably connected to clothing worn by the user; and/or (iii) configured to be detachably mounted directly to the user's skin.

In the example wearable computing device 1 shown in FIG. 2, the flexible touch pad 3 includes a boundary area 8. The integrated circuit 4 and the transceiver 6 may be in the boundary area 8 of the flexible touch pad 3.

Figure 3:
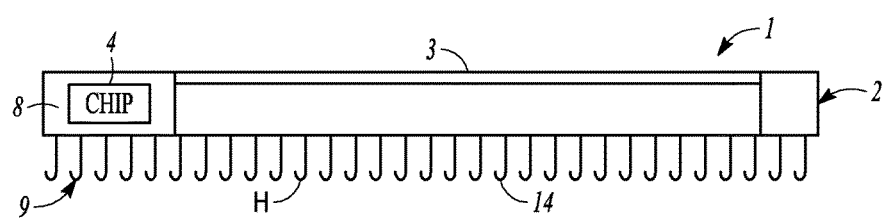
FIG. 3 shows the wearable computing device of FIG. 2 where the wearable computing device includes a hook-and-loop attachment system.
Figure 4:
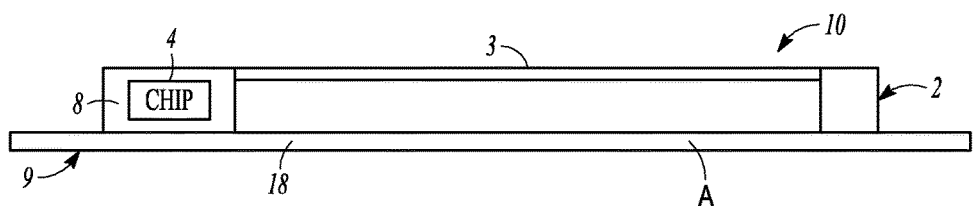
FIG. 4 shows the wearable computing device of FIG. 2 where the wearable computing device includes an adhesive.

As shown in FIG. 3, the example wearable computing device 1 may further include a detachment mechanism 9 for selectively attaching the wearable computing device 1 to the user's body. FIG. 3 shows the wearable computing device 1 of FIG. 2 where the detachment mechanism 9 includes hook-and-loop attachment system H. FIG. 4 shows the wearable computing device 1 of FIG. 2 where the detachment mechanism 9 includes an adhesive A such that the wearable computing device 1 may be detachably connected to the user's skin or clothing using the adhesive A.

Figure 5:
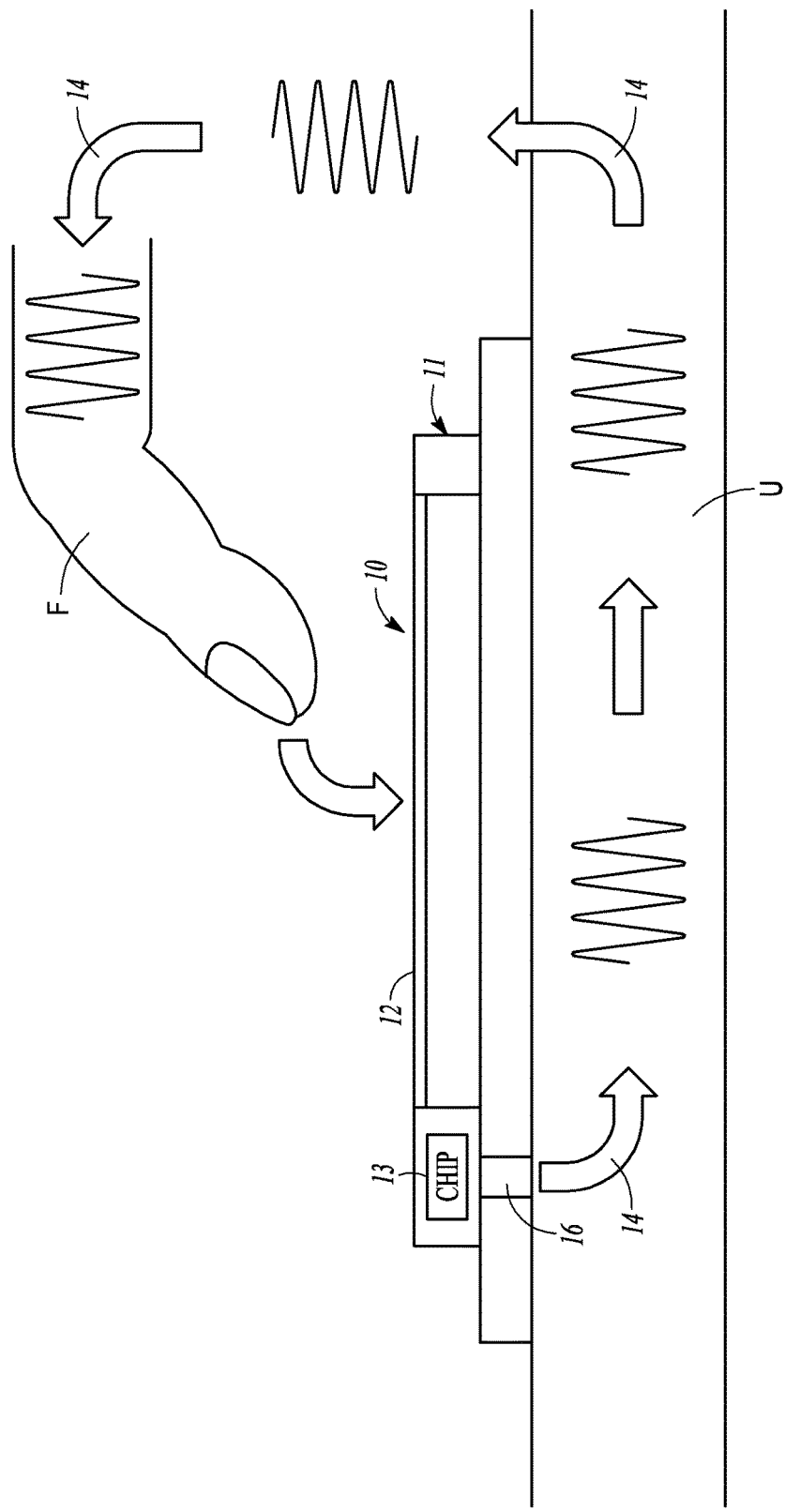
FIG. 5 illustrates a schematic side view of an example personalized wearable computing device.

FIG. 5 illustrates a schematic side view of an example wearable computing device 10 where user inputs to the wearable computing device 10 may be personalized. The wearable computing device 10 includes a flexible support 11 that is configured to be worn by a user U that wears the wearable computing device 10.

The wearable computing device 10 includes a flexible touch pad 12 that is mounted to the flexible support 11 and an integrated circuit 13 mounted to the flexible support 11. The integrated circuit 13 detects contact with the flexible touch pad 12 when the contact is made only by the user U that is wearing the wearable computing device 10 and no other users.

In some forms, the integrated circuit 13 determines that contact is made only by the user U that is wearing the wearable computing device and no other users by sending an electrical signal 14 through the user's skin. The flexible touch pad 12 only recognizes contact with the flexible touch pad 12 when the contact passes the electrical signal 14 to the flexible touch pad 12. As an example, the integrated circuit 13 may send an electrical signal 14 through the user's skin to the user's finger F.

It should be noted that the integrated circuit 13 may generate any type of electrical signal 14 that may be suitable for personalizing contact by the user with the flexible touch pad 12. As an example, the electrical signal 14 may be at a designated trigger frequency. If the user' skin is touching the wearable computing device 10, the wearable computing device 10 may recognize the trigger frequency and recognize the contact as an input to the wearable computing device 10.

Therefore, if the wearable computing device 10 is touched by a non-designated user without the right trigger frequency the wearable computing device 10 may ignore the input. Personalizing a trigger frequency may avoid unwanted inputs by other people accidently contacting the wearable computing device 10.

In some, a low voltage trigger frequency might be applied from the wearable computing device 10 via a contact 16 (e.g., a Cu-Stud or bodkin) on the wearable computing device 10 to the skin of the designated user U. Requiring an appropriate trigger frequency when contacting the wearable computing device 10 may avoid unwanted inputs on the wearable computing device 10, especially when the designated user is operating the wearable computing device 10 in crowded places like busses, trains, etc.

Figure 6:
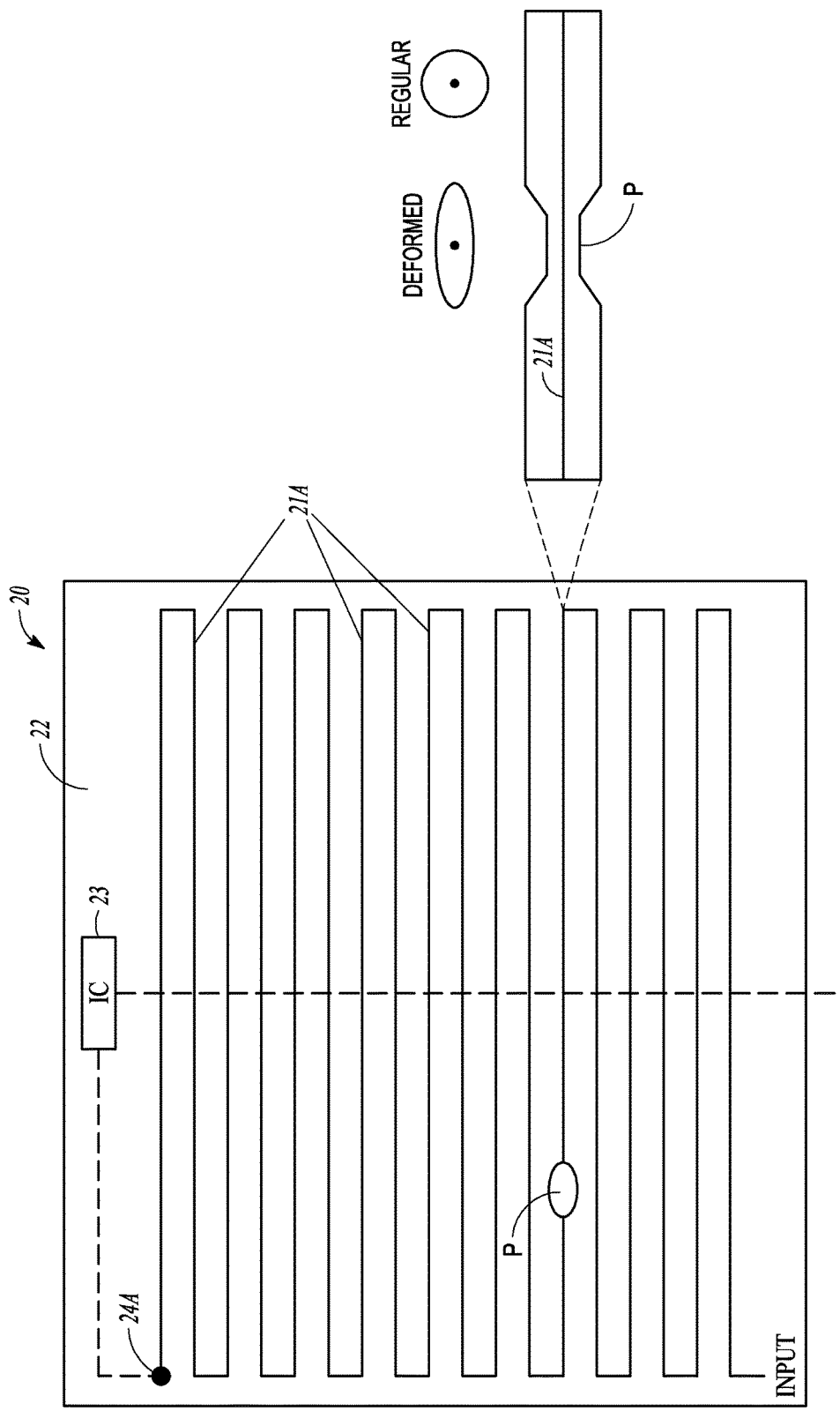
FIGS. 6-8 show another example wearable computing device that includes transmission lines which are integrated into a touch pad.

FIG. 6 shows another example wearable computing device 20 that includes a flexible transmission line 21A which is integrated into a flexible touch pad 22. The flexible touch pad 22 configured to be worn by a user. The wearable computing device 20 further includes a first detector 24A at an end of the flexible transmission line 21A.

The wearable computing device 20 further includes an integrated circuit 23 mounted to the flexible touch pad 22. The integrated circuit 23 interprets contact with the flexible touch pad 22 by sending a first electrical signal through the first transmission line 21A and determining a localized change in impedance in the first transmission line 21A by using time domain reflectometry (as an example). Touching and deforming the transmission line 21A (e.g., at point P) leads to a local change of its line impedance.

Figure 7:
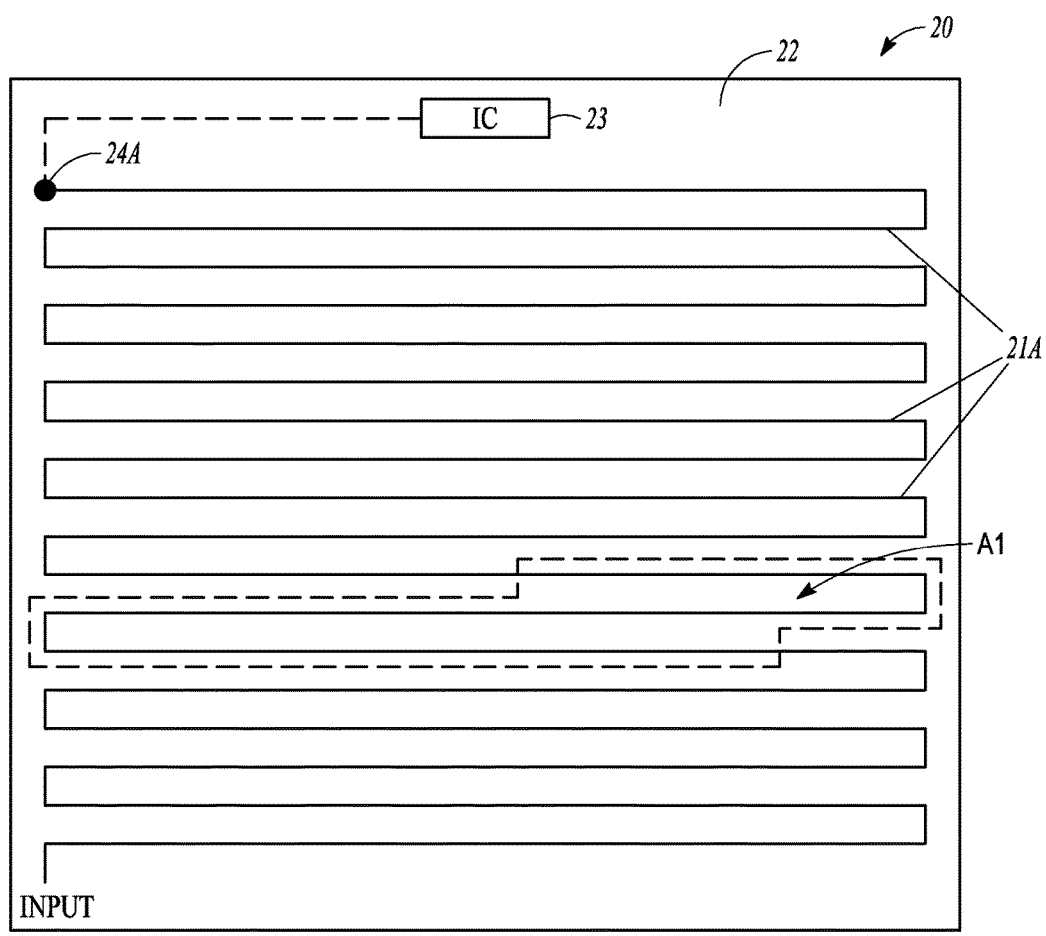

The meandering structure of transmission line 21A over the flexible touch pad 22 may allow for partial localization. As shown in FIG. 7, the partial localization provided by transmission line 21A may be within area A1.

Figure 8:
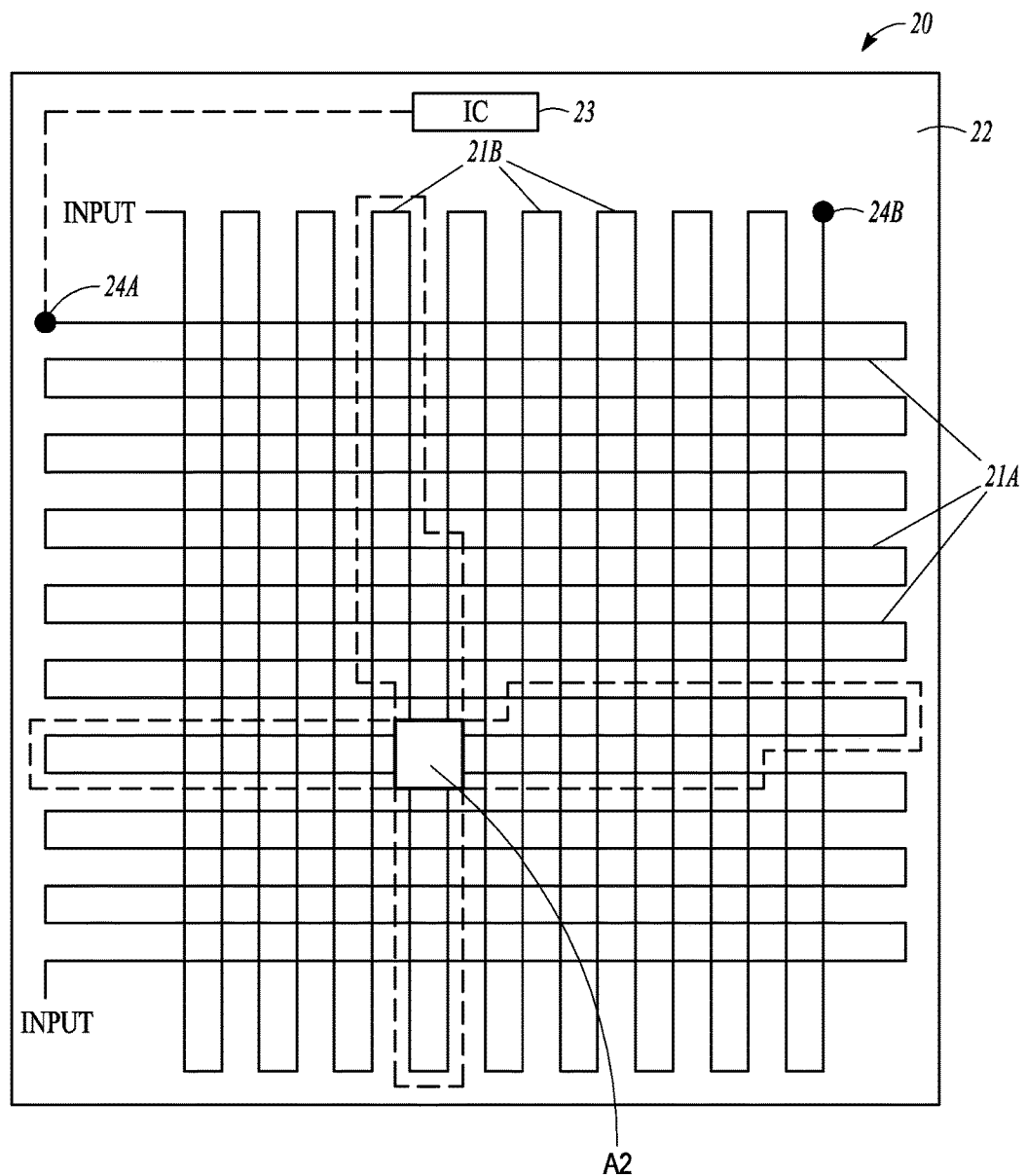

As shown in FIG. 8, the flexible touch pad 22 may further include a second flexible transmission line 21B. The integrated circuit 23 interprets contact with the flexible touch pad 22 by sending a second electrical signal through the second transmission line 21B and determining a localized change in impedance in the second transmission line 21B by using time domain reflectometry (as an example). The wearable computing device 20 further includes a second detector 24B at an end of the second flexible transmission line 21b.

Combining information from the two overlapping transmission lines 21A, 21B may allow for more accurate contact localization. The meandering structure of transmission lines 21A, 21B back and forth from side-to-side over the flexible touch pad 22 may allow for further localization. As an example, combining information from the transmission lines 21A, 21B, the localization may be further narrowed to within area A2.

In the example form illustrated in FIG. 8, the second transmission line 21B is oriented perpendicularly to the transmission line 21A at each of the multiple points where the first and second transmission line 21A, 21B cross one another. It should be noted that in other forms, the transmission lines 21A, 21B may cross at other angles.

One potential benefit of the wearable computing device 20 is that the number of detectors does not increase as the size of the touch pad 22 increases. As an example, the wearable computing device 20 may require only two detectors 24A, 24B instead of the numerous detectors that are required with conventional touch pads. Therefore, the resolution of the flexible touch pad 22 is not related to the area of the flexible touch pad 22 making the wearable computing device 20 suitable for use with a wide range of flexible touch pad 22 sizes.

In addition, if the wearable computing device 20 is integrated into clothing, there is no noise due to capacitive coupling with the body of the person wearing the wearable computing device 20. The lack of capacitive coupling may improve the performance of the wearable computing device 20.

In some forms of the wearable computing device 20, the transmission lines 21A, 21B are coax lines or twisted pair lines that are integrated into the flexible touch pad 22. The layout of each of the transmission lines 21A, 21B may cover the whole touch pad 22 area (e.g., in the meander-like geometry shown in FIG. 8).

As discussed above, touching and deforming each of the transmission lines 21A, 21B leads to a local change in impedance of each transmission line 21A, 21B. In some forms, radio frequency pulses are fed into the respective transmission lines 21A, 21B. The respective radio frequency pulses are reflected by the impedance discontinuity created by the touching and deforming.

The position of the deformity along each transmission line may be calculated from the time between the original and the reflected pulse (e.g., using Time Domain Reflectometry). In addition, the first and second detectors 24A, 24B may be used for each respective transmission line 21A, 21B in order to detect the position of the deformity along each transmission line 21A, 21B.

The resolution of the wearable computing device 20 may depend in part on how accurately the delay between the propagating and the reflected pulse can be measured. The resolution does not depend on the absolute length of the transmission lines 21A, 21B making the wearable computing device 20 readily scalable to longer line lengths, and correspondingly larger flexible touch pad 22 areas.

Figure 9:
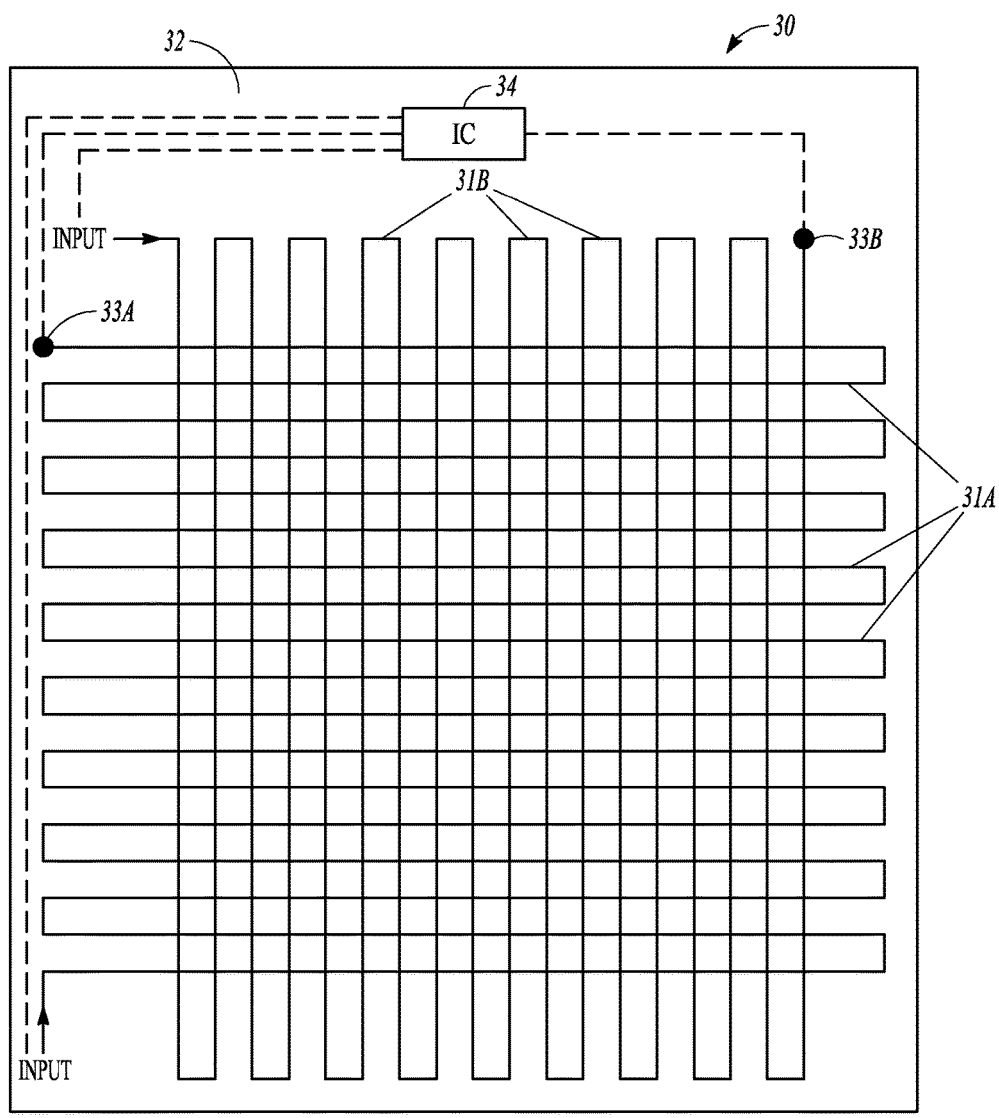
FIGS. 9-10 show another example wearable computing device that includes optical fibers which are integrated into a touch pad.

FIG. 9 shows an alternative form of a wearable computing device 30 that includes a flexible touch pad 32 configured to be worn by a user. As compared to the wearable computing device 20, the two transmission lines 21A, 21B may be replaced by the first and second optical fibers 31A, 31B. The wearable computing device 30 further includes a first detector 33A at an end of the first optical fiber 31A and a second detector 33B at an end of the second optical fiber 31B.

The wearable computing device 30 further includes an integrated circuit 34 mounted to the flexible touch pad 32. The integrated circuit 34 interprets contact with the flexible touch pad 32 by sending radiation through the first and second optical fibers 31A, 31B to the respective first and second detectors 33A, 33B. The radiation propagates between the first and second optical fibers 31A, 31B when the first and second optical fibers 31A, 31B are forced near each other due to contact with the flexible touch pad 32. The location of the contact with the flexible touch pad 32 is determining by analyzing the radiation propagation times through the first and second optical fibers 31A, 31B to the respective first and second detectors 33A, 33B.

When the two optical fibers 31A, 31B are pressed against each other, radiation (i.e., electromagnetic radiation, light, visible light, infrared light) may propagate between two optical fibers 31A, 31B. The location of the contact (i.e., applied pressure) to the touch pad 32 may be obtained by analyzing the signal propagation times.

In the example form shown in FIG. 9, the two optical fibers 31A, 31B have a detector 33A, 33B at each respective end. The two optical fibers 31A, 31B are configured in a way that allows light to propagate between the two optical fibers 31A, 31B when the two optical fibers 31A, 31B fibers are pressed against each other (i.e., due to contact with the flexible touch pad).

In some forms, the first optical fiber 31A meanders back and forth from side to side over the flexible touch pad 32 without crossing. In addition, the second optical fiber 31B meanders back and forth from side to side over the flexible touch pad 32 without crossing. The first optical fiber 31A and the second optical fiber 31B cross each other at several locations.

Figure 10:
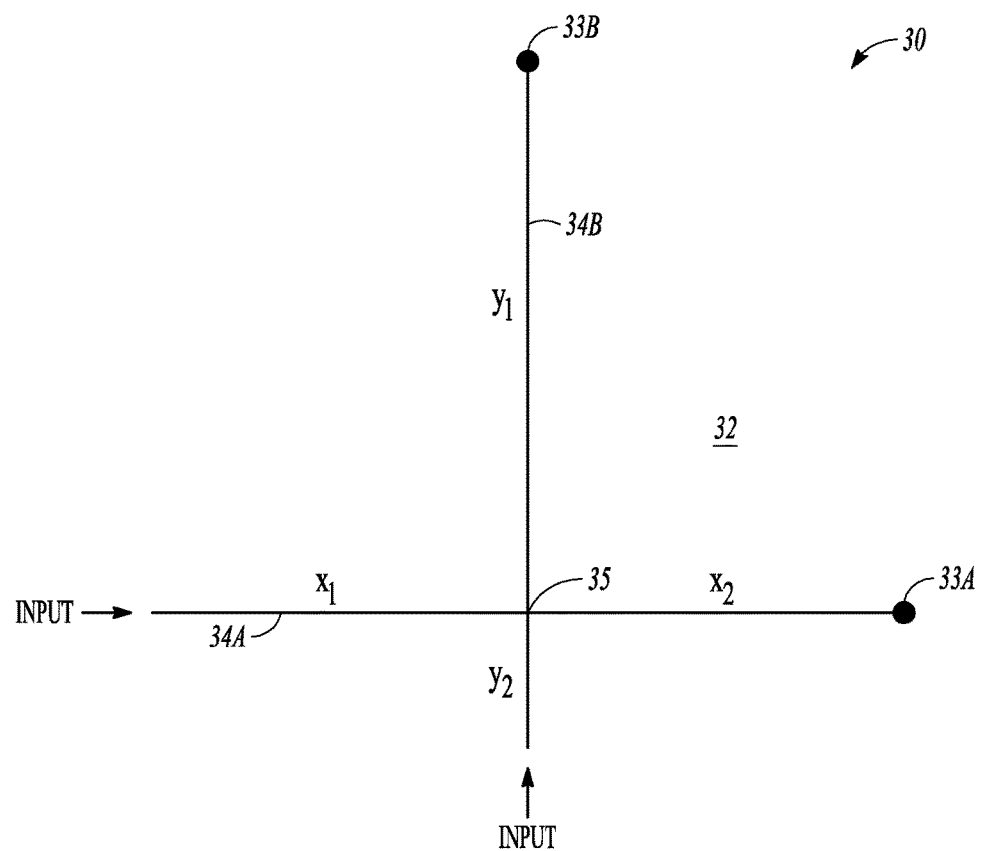

The principle of position detection when using the radiation (i.e., light) propagation between the two optical fibers 31A, 31B will now be described relative to FIG. 10. The two meandering optical fibers 31A, 31B have been replaced by straight optical fibers 34A, 34B with only one intersection 35.

Measurements of the propagation times from inputs to detectors 33A, 33B give the distances x1+y1, x2+y2, x1+x2 and y1+y2. From these determined distances x1, x2, y1, y2, may be calculated to establish the position of the intersection 35.

The radiation propagation times may be determined by measuring the amount time it takes for (i) a first radiation to travel through the first optical fiber 34A to the second detector 33B after propagation of the radiation from the first optical fiber 34A to the second optical fiber 34B; and (ii) a second radiation to travel through the second optical fiber 34B to the first detector 33A after propagation of the radiation from the second optical fiber 34B to the first optical fiber 34A. In some forms, the first radiation is at a different frequency than the second radiation.

It should be noted that in the case multiple intersections of meandering optical fibers 31A, 31B, a pulse is fed into one optical fiber (e.g., optical fiber 31A) which results in several pulses arriving at the detector 33B of the other optical fiber (e.g., optical fiber 31B). Each pulse received by the detector 33B corresponds to an intersection and may be analyzed as described above.

Figure 11:
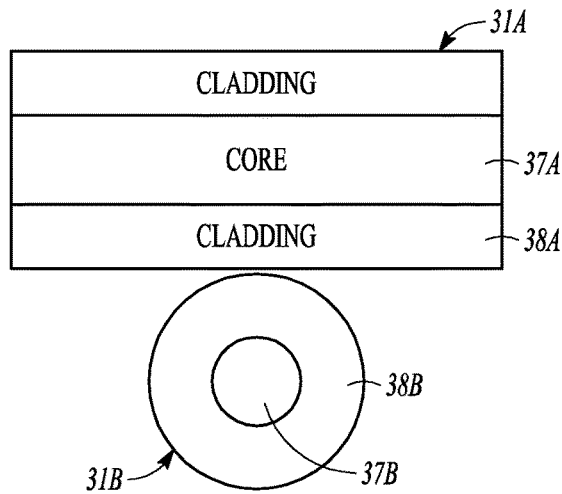
FIGS. 11-13 show the progression of bringing the optical fibers shown in FIGS. 9-10 together to pass light between the optical fibers.
Figure 12:
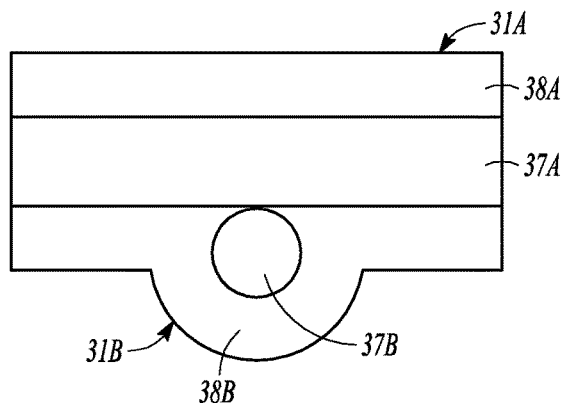
Figure 13:
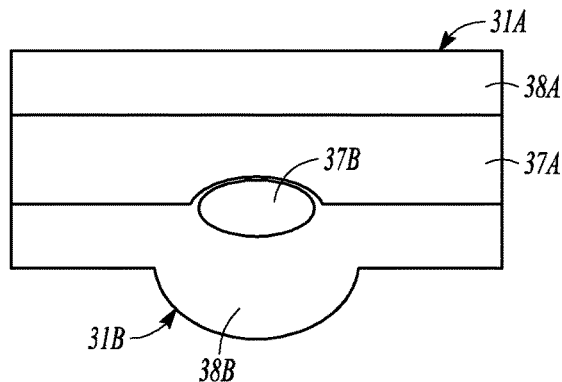

FIGS. 11-13 show the progression of bringing the optical fibers 31A, 31B shown in FIG. 9 together to pass light between the optical fibers 31A, 31B. In some forms, the optical fibers 31A, 31B may each include a core 37A, 37B through which the light propagates. The optical fibers 31A, 31B may further include a cladding 38A, 38B with a lower index of refraction that ensures almost total reflection at the interface between the cores 37A, 37B and the respective claddings 38A, 38B.

As shown in FIGS. 11-13, upon pressing the optical fibers 31A, 31B against each other, the cores 37A, 37B get very close to each other (see FIG. 12) and may eventually touch (see FIG. 13). If the cores 37A, 37B get close enough to each other, light will propagate between the cores 37A, 37B.

As shown in FIG. 12, the claddings 38A, 38B may be a compressible cladding (e.g., comprising a silicone material). In addition, the cores 37A, 37B may be compressible to increase surface area contact between the cores 37A, 37B upon contacting the flexible touch pad 32 (see FIG. 13)

In some forms, the area where the cores 37A, 37B almost touch, or touch, may be increased by using a soft, deformable core material. In alternative forms, only an outer layer of the cores 37A, 37B may comprise a softer material.

Figure 14:
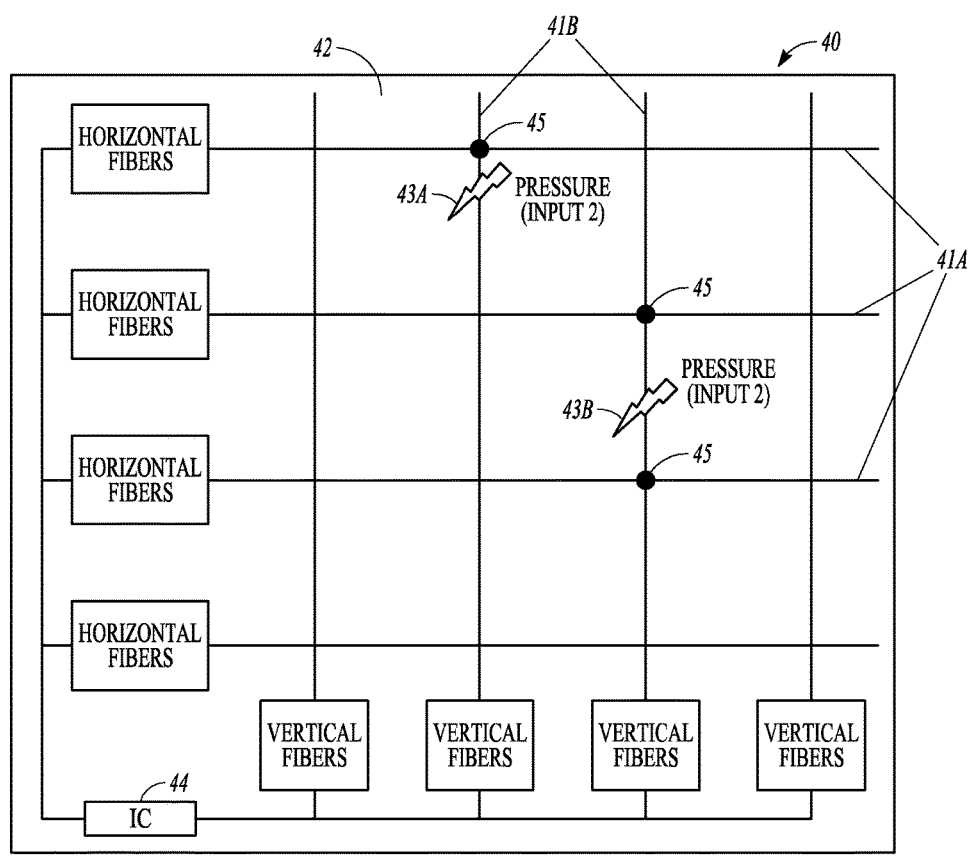
FIG. 14 illustrates another example wearable computing device that includes a touch pad.

FIG. 14 illustrates another example wearable computing device 40 that includes a flexible touch pad 42. The example wearable computing device 40 includes conductive fibers 41A, 41B that detect pressure on the conductive fibers 41A, 41B.

The conductive fibers 41A, 41B include a plurality of conducting fibers that are arranged in an intersecting configuration over the flexible touch pad 42 as shown in FIG. 14. It should be noted that each of the conductive fibers 41A, 41B may be an individual fiber or a composite of fibers.

The example wearable computing device 40 further includes an integrated circuit 44 mounted to the flexible touch pad 42. The integrated circuit 44 interprets contact with the flexible touch pad 42 by detecting a change in resistance between intersecting conducting fibers 41A, 41B.

The conductive fibers 41A, 41B may carry electrical signals. In addition, each conducting fiber may be electrically isolated from every other conducting fiber until there is contact with the flexible touch pad 42. As an example, the conductive fibers 41A, 41B may be arranged and may be used to detect the contact location in a manner known from the cell locations in a DRAM device.

One of the potential operating principles for the wearable computing device 40 relates to a change of leakage values due to touching of the conductive fibers 41A, 41B. As an example, a reduction in the resistance value below a certain level due to contact with the conducting fibers creates a logical 0 or 1 that the integrated circuit 44 uses to determine the position of contact with the flexible touch pad 42. As another example, when the conductive fibers 41A, 41B are electrically isolated with low current the conductive fibers 41A, 41B may create logical 0 or 1.

Another of the potential operating principles for the wearable computing device 40 relates to a change of resistance values due to touching of the fibers 41A, 41B. This change of resistance values due to touching of the fibers 41A, 41B creates a current signal or voltage drop.

When there is pressure inputs (comparable to the press of a button) nodes 45 may generated between intersecting conductive fibers 41A, 41B. FIG. 14 shows two pressure inputs 43A, 43B that create three nodes 45. Changes in resistance of an intersection between a horizontal conducting fiber 41A and a vertical conducting fiber 41B creates a node 45 that determines a location of a contact with the flexible touch pad 42. The physical position of these nodes 45 on the touch sensitive display 42 establish a user input to the wearable computing device 40.

Forms of the wearable computing device 40 are contemplated where information may not be limited to logical 0 and 1. As an example, a state in between logic 0 and 1 is possible where this state is used to evaluate the level of pressure.

The wearable computing device 40 may provide for physical separation between an input device and an application that is performed by the wearable computing device 40. As an example, this separation may inhibit vandalism or any unwanted engagement with other electronics that receive input from wearable computing device 40.

The wearable computing device 40 may also be made in relatively large sizes. The wearable computing device 40 may be made larger merely by adding additional conductive fibers 41A, 41B. The resolution of the wearable computing device 40 will depend in part on how many conductive fibers 41A, 41B are included relatively to size of the wearable computing device 40. The wearable computing device 40 described herein may also be cost effective to manufacture.

Figure 15:
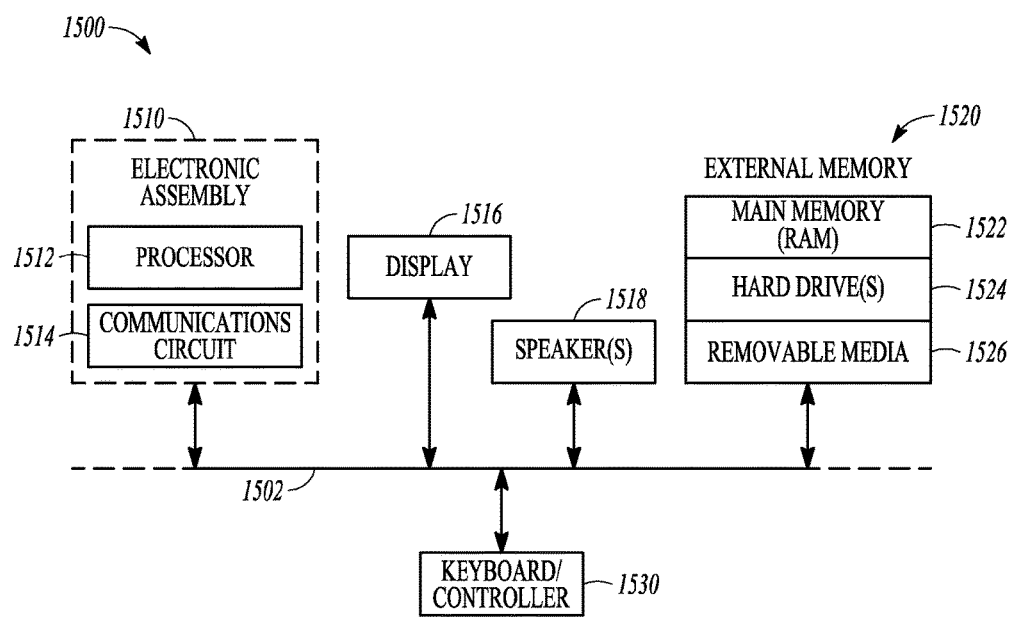
FIG. 15 is block diagram of an electronic apparatus that includes the electronic assemblies and/or the electronic packages described herein.

FIG. 15 is a block diagram of an electronic apparatus 1500 incorporating at least one wearable computing device 1, 10, 20, 30, 40 described herein. Electronic apparatus 1500 is merely one example of an electronic apparatus in which forms of the wearable computing devices 1, 10, 20, 30, 40 described herein may be used. Examples of an electronic apparatus 1500 include, but are not limited to, personal computers, tablet computers, mobile telephones, game devices, MP3 or other digital media players, etc. In this example, electronic apparatus 1500 comprises a data processing system that includes a system bus 1502 to couple the various components of the electronic apparatus 1500. System bus 1502 provides communications links among the various components of the electronic apparatus 1500 and may be implemented as a single bus, as a combination of busses, or in any other suitable manner.

An electronic apparatus 1500 as describe herein may be coupled to system bus 1502. The electronic apparatus 1500 may include any circuit or combination of circuits. In one embodiment, the electronic apparatus 1500 includes a processor 1512 which can be of any type. As used herein, "processor" means any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, or any other type of processor or processing circuit.

Other types of circuits that may be included in electronic apparatus 1500 are a custom circuit, an application-specific integrated circuit (ASIC), or the like, such as, for example, one or more circuits (such as a communications circuit 1514) for use in wireless devices like mobile telephones, tablet computers, laptop computers, two-way radios, and similar electronic systems. The IC can perform any other type of function.

The electronic apparatus 1500 may also include an external memory 1520, which in turn may include one or more memory elements suitable to the particular application, such as a main memory 1522 in the form of random access memory (RAM), one or more hard drives 1524, and/or one or more drives that handle removable media 1526 such as compact disks (CD), flash memory cards, digital video disk (DVD), and the like.

The electronic apparatus 1500 may also include a display device 1516, one or more speakers 1518, and a keyboard and/or controller 1530, which can include a mouse, trackball, touch pad, voice-recognition device, or any other device that permits a system user to input information into and receive information from the electronic apparatus 1500.

To better illustrate the wearable computing devices 1, 10, 20, 30, 40 disclosed herein, a non-limiting list of examples is provided herein:

Example 1 includes a wearable computing device. The wearable computing device includes a flexible touch pad configured to be worn by a user and an integrated circuit mounted to the flexible touch pad. The integrated circuit interprets contact with the flexible touch pad. A transceiver is mounted to the flexible touch pad. The transceiver sends and receives signals to and from a separate electronic device.

Example 2 includes the wearable computing device of example 1, wherein the flexible touch pad is configured to be mounted directly to the user's body.

Example 3 includes the wearable computing device of any one of examples 1-2, wherein the flexible touch pad are configured to be incorporated into a textile.

Example 4 includes the wearable computing device of any one of examples 1-3, and further including a detachment mechanism for selectively attaching the wearable computing device to the user's body.

Example 5 includes the wearable computing device of example 4, wherein the detachment mechanism includes a hook-and-loop fastening system for selective attachment of the wearable computing device to a textile worn by the user.

Example 6 includes the wearable computing device of any one of examples 4-5, wherein the separate electronic device is configured to be worn by the user.

Example 7 includes a wearable computing device. The wearable computing device includes a flexible touch pad configured to be worn by a user. The flexible touch pad includes a first transmission line and an integrated circuit mounted to the flexible touch pad. The integrated circuit configured to interpret contact with the flexible touch pad by sending a first electrical signal through the first transmission line and determining a localized change in impedance in the first transmission line.

Example 8 includes the wearable computing device of example 7, wherein the flexible touch pad includes a second transmission line, and the integrated circuit interprets contact with the flexible touch pad by sending a second electrical signal through the second transmission line and determining a localized change in impedance in the second transmission line.

Example 9 includes the wearable computing device of any one of examples 7-8, wherein the first electrical signal and the second electrical signal are each radio frequency signals.

Example 10 includes the wearable computing device of any one of examples 7-9, wherein the first transmission line meanders back and forth from side to side over the flexible touch pad without crossing the first transmission line, and the second transmission line meanders back and forth from side to side over the flexible touch pad without crossing the second transmission line.

Example 11 includes the wearable computing device of any one of examples 7-10, wherein the integrated circuit determines the localized change in impedance in the first transmission line using time domain reflectometry and determines the localized change in impedance in the second transmission line using time domain reflectometry.

Example 12 includes the wearable computing device of any one of examples 9-11, wherein the first transmission line and the second transmission line cross each other at several locations.

Example 13 includes the wearable computing device of example 12, wherein the first transmission line and the second transmission line are orthogonal to one another where the first transmission line and the second transmission line cross each other.

Example 14 includes a wearable computing device. The wearable computing device includes a flexible touch pad configured to be worn by a user. The flexible touch pad includes a first optical fiber and a second optical fiber. The flexible touch pad further includes a first detector at an end of the first optical fiber and a second detector at an end of the second optical fiber. An integrated circuit is mounted to the flexible touch pad. The integrated circuit configured to interpret contact with the flexible touch pad by sending radiation through the first and second optical fibers to the respective first and second detectors. The radiation propagates between the first and second optical fibers when the first and second optical fibers are forced near each other due to contact with the flexible touch pad. The location of the contact with the touch pad is determined by analyzing the radiation propagation times through the first and second optical fibers to the respective first and second detectors.

Example 15 includes the wearable computing device of example 14, wherein the radiation is light.

Example 16 includes the wearable computing device of any one of examples 14-15, wherein the first optical fiber meanders back and forth from side to side over the flexible touch pad without crossing, and wherein the second optical fiber meanders back and forth from side to side over the flexible touch pad without crossing, and wherein the first optical fiber and the second optical fiber cross each other at several locations.

Example 17 includes the wearable computing device of any one of examples 14-16, wherein the first optical fiber and the second optical fiber contact each other due to contact with the flexible touch pad, wherein the radiation propagation times are determined by measuring the amount time it takes for (i) a first radiation to travel through the first optical fiber to the second optical fiber then to the second detector; and (ii) a second radiation to travel through the second optical fiber to the first optical fiber then to the first detector.

Example 18 includes the wearable computing device of any one of examples 14-17, wherein the first radiation is at a different frequency than the second radiation.

Example 19 includes the wearable computing device of any one of examples 14-18, wherein the first and second optical fibers each include a core through which the radiation propagates and a cladding with lower index of refraction than the core for enabling reflection at an interface between the cores and the respective claddings.

Example 20 includes the wearable computing device of example 19, wherein the claddings are compressible to facilitate moving the cores together upon contacting the flexible touch pad, and wherein the cores may be compressible to increase surface area contact between the cores upon contacting the flexible touch pad.

Example 21 includes a wearable computing device. The wearable computing device includes a flexible touch pad configured to be worn by a user. The flexible touch pad includes a plurality of conducting fibers arranged in an intersecting configuration over the flexible touch pad. An integrated circuit is mounted to the flexible touch pad. The integrated circuit interprets contact with the flexible touch pad by detecting a change in resistance between intersecting conducting fibers.

Example 22 includes the wearable computing device of example 21, wherein the plurality of conducting fibers are arranged in an intersecting horizontal and vertical configuration.

Example 23 includes the wearable computing device of any one of examples 21-22, wherein each conducting fiber is electrically isolated from every other conducting fiber until there is contact with the flexible touch pad.

Example 24 includes the wearable computing device of any one of examples 21-23, wherein the conducting fibers carry electrical signals.

Example 25 includes the wearable computing device of any one of examples 21-24, wherein a reduction in the resistance value below a certain level due to contact with the conducting fibers creates a logical 0 or 1 that the integrated circuit uses to determine the position of contact with the flexible touch pad.

Example 26 includes the wearable computing device of any one of examples 21-25, wherein changes in resistance of an intersection between a horizontal conducting fiber and a vertical conducting fiber creates a node that determines a location of a contact with the flexible touch pad.

Example 27 includes a wearable computing device. The wearable computing device includes a flexible touch pad configured to be worn by a user that wears the wearable computing device and an integrated circuit mounted to the flexible touch pad. The integrated circuit detects contact with the flexible touch pad when the contact is made only by the user that is wearing the wearable computing device and no other users.

Example 28 includes the wearable computing device of example 27, wherein the integrated circuit determines that contact is made with the flexible touch pad only by the user that is wearing the wearable computing device and no other users by sending an electrical signal through the user's skin, and wherein the flexible touch pad only recognizes contact with the flexible touch pad when the contact passes the electrical signal to the flexible touch pad.

Example 29 includes the wearable computing device of example 28, wherein the integrated circuit sends an electrical signal through the user's skin to the user's finger. This overview is intended to provide non-limiting examples of the present subject matter. It is not intended to provide an exclusive or exhaustive explanation. The detailed description is included to provide further information about the methods.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description.

The Abstract is provided to comply with 37 C.F.R. §1.72(b), to allow the reader to quickly ascertain the nature of the technical disclosure. It is submitted with the understanding that it will not be used to interpret or limit the scope or meaning of the claims.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A wearable computing device, comprising:
   a flexible touch pad configured to be worn by a user;
   an integrated circuit mounted to the flexible touch pad, the integrated circuit interprets contact with the flexible touch pad, wherein the integrated circuit generates an electric signal at a particular frequency and delivers the electronic signal through the user to the flexible touch pad when the user touches the flexible touch pad, wherein the integrated circuit detects contact with the flexible touch pad when the contact is made only by the user that is wearing the wearable computing device and no other users; and
   a transceiver mounted to the flexible touch pad, the transceiver sends and receives signals to and from a separate electronic device.

2. The wearable computing device of claim 1, wherein the flexible touch pad are configured to be incorporated into a textile.

3. The wearable computing device of claim 1, wherein the separate electronic device is configured to be worn by the user.

4. The wearable computing device of claim 1, wherein the integrated circuit sends the electrical signal through the user to the user's finger.

* * * * *